(12) United States Patent
Zavalkovsky et al.

(10) Patent No.: US 8,578,018 B2
(45) Date of Patent: Nov. 5, 2013

(54) USER-BASED WIDE AREA NETWORK OPTIMIZATION

(75) Inventors: Arthur Zavalkovsky, Ramat Poleg (IL); Itai Almog, Tel-Aviv (IL)

(73) Assignee: Microsoft Corporation, Redmond, WA (US)

(*) Notice: Subject to any disclaimer, the term of this patent is extended or adjusted under 35 U.S.C. 154(b) by 586 days.

(21) Appl. No.: 12/164,076

(22) Filed: Jun. 29, 2008

(65) Prior Publication Data
US 2009/0327479 A1    Dec. 31, 2009

(51) Int. Cl.
*G06F 15/173* (2006.01)

(52) U.S. Cl.
USPC .......................................................... 709/224

(58) Field of Classification Search
USPC .......................................................... 709/224
See application file for complete search history.

(56) References Cited

U.S. PATENT DOCUMENTS

| | | | | |
|---|---|---|---|---|
| 5,606,359 | A * | 2/1997 | Youden et al. | 725/88 |
| 5,627,829 | A | 5/1997 | Gleeson et al. | |
| 7,072,331 | B2 | 7/2006 | Liu et al. | |
| 7,130,616 | B2 | 10/2006 | Janik | |
| 7,154,859 | B2 | 12/2006 | Purpura | |
| 2001/0043600 | A1* | 11/2001 | Chatterjee et al. | 370/390 |
| 2002/0161860 | A1* | 10/2002 | Godlin et al. | 709/219 |
| 2003/0217125 | A1 | 11/2003 | Brancati et al. | |
| 2004/0139167 | A1* | 7/2004 | Edsall et al. | 709/212 |
| 2005/0235044 | A1* | 10/2005 | Tazuma | 709/217 |
| 2007/0206621 | A1 | 9/2007 | Plamondon et al. | |
| 2007/0226320 | A1 | 9/2007 | Hager et al. | |
| 2007/0233851 | A1 | 10/2007 | Ma | |
| 2007/0261005 | A1* | 11/2007 | Kreiner | 715/830 |
| 2008/0224902 | A1* | 9/2008 | Samuels et al. | 341/51 |
| 2008/0228772 | A1* | 9/2008 | Plamondon | 707/10 |

FOREIGN PATENT DOCUMENTS

EP    1161047 A2 *  12/2001

OTHER PUBLICATIONS

Sterbenj, et al., "Latency-Aware Information Access with User-Directed Fetch Behaviour for Weakly-Connected Mobile Wireless Clients", May 9, 2002, pp. 01-10.
Saito, et al., "Taming aggressive replication in the Pangaea wide-area file system", Dec. 2002, Boston, USA. pp. 01-16.
Griffioen, et al., "Automatic Prefetching in a WAN", 1993, pp. 01-06.
Cisco Systems, "Cisco Systems Cisco Wide Area File Services", © 2005 Cisco Systems, Inc., 10 pages.

* cited by examiner

*Primary Examiner* — William Goodchild

(57) ABSTRACT

An improved user experience at a local client computer that is coupled to one or more remote servers over a WAN is provided by an arrangement in which data and files that are likely to be needed by a user during a work session are identified through the application of one or more heuristics and then pre-fetched to be made available in advance of the session's start. The pre-fetching of the data and files may be performed as the client computer goes through its startup or boot process. When the startup is completed and the desktop applications become ready for use, the data and files that the user needs to immediately begin work are already available at the local client computer.

20 Claims, 5 Drawing Sheets

USER-BASED WIDE AREA NETWORK OPTIMIZATION

BACKGROUND

Information technology ("IT") management in organizations that operate branch offices must accommodate the often-conflicting needs of local-like application performance and manageability versus deployment costs. To reduce total cost of ownership ("TCO"), there is a trend where branch office servers are consolidated, and services and applications are pushed from the LAN (local area network) to being hosted across a WAN (wide area network) from a hub that is commonly located at an enterprise's headquarters location. While such branch and hub architectures can provide substantial cost benefits, the reliance on WAN resources can often lead to depleted bandwidth and increased end-user wait time. This typically results in a reduction in the quality of the user experience at a branch office compared to that at the main office, and an overall loss of productivity in the branch.

One solution to the problem has been to add more wide area bandwidth, and historically data services commonly consume a large portion of enterprise IT budgets. However, incremental increases in bandwidth can carry a disproportionate price increase and limiting factors such as network latency and application behavior can restrict both performance and the return on bandwidth investment.

WAN optimization solutions such as wide area file systems ("WAFS") have emerged that seek to enable the cost advantages provided by centralized servers without compromising performance by maximizing WAN utilization which can often delay or eliminate the need to purchase additional WAN bandwidth. While such solutions can provide significant benefits and typically represent a good return on investment, current WAN optimization and WAFS solutions are typically file- or data-oriented and do not take users' behaviors into account. Accordingly, additional opportunities still remain for more effective WAN optimization.

This Background is provided to introduce a brief context for the Summary and Detailed Description that follow. This Background is not intended to be an aid in determining the scope of the claimed subject matter nor be viewed as limiting the claimed subject matter to implementations that solve any or all of the disadvantages or problems presented above.

SUMMARY

An improved user experience at a local client computer that is coupled to one or more remote servers over a WAN is provided by an arrangement in which data and files that are likely to be needed by a user during a work session are identified through the application of one or more heuristics and then pre-fetched to be made available in advance of the session's start. The pre-fetching of the data and files may be performed as the client computer goes through its startup or boot process. When the startup is completed and the desktop applications become ready for use, the data and files that the user needs to immediately begin work are already available at the local client computer.

In an illustrative example, a domain server which provides access control using authentication, authorization, and accounting ("AAA") services is operatively coupled to a WAN optimization appliance such as one of a pair of WAFS controllers that are typically deployed pair-wise in respective hub and branch subnets of an enterprise network that are connected over a WAN link. When the user logs in to the domain server to begin work, the domain controller notifies the local WAFS controller which can begin pre-fetching data and files identified using heuristics which take expected user behavior into account.

Illustrative heuristics include, for example, recently edited files, directory information for mirrored documents or folders, file names that are explicitly configured by a network administrator, home pages for web browsers, and the like. The WAFS controllers may apply one or more WAN optimization techniques to transport the identified data and files across the WAN to efficiently utilize available bandwidth and reduce latency. The combination of the features provided by the access control system and the WAN optimization appliances advantageously provides the user with the perception of a quick and responsive network and an overall experience in the branch subnet that is more transparent, seamless, and LAN-like.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

Like reference numerals indicate like elements in the drawings.

DETAILED DESCRIPTION

Figure 1:
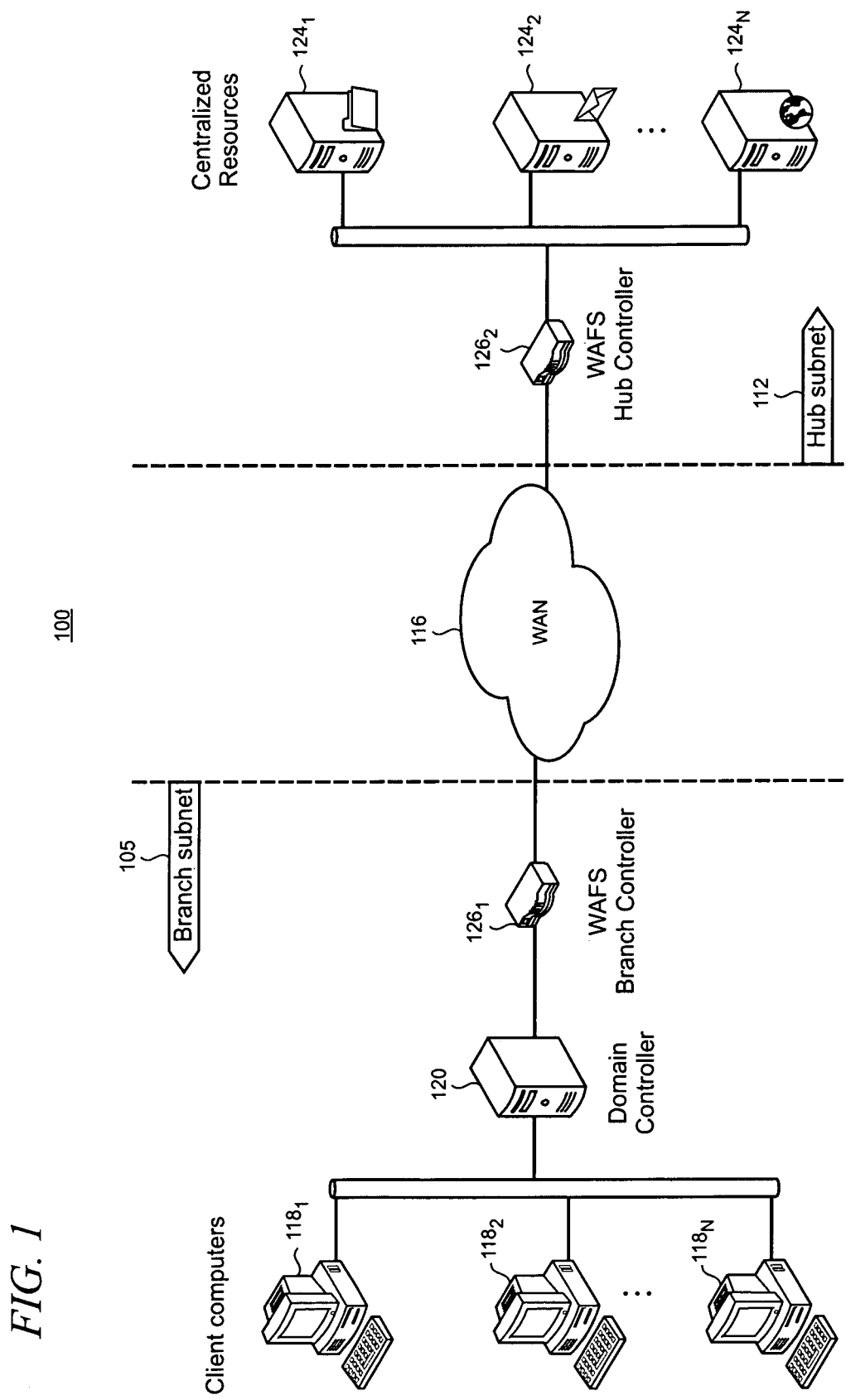
FIG. 1 shows an illustrative hub and branch network using WAFS controllers in each subnet and a domain controller in the branch subnet.

FIG. 1 shows an illustrative hub and branch network 100 in which a branch subnet 105 is coupled to a hub subnet 112 over a WAN 116. The term "branch" is used to describe a remote location of any-sized organization that connects to a collection of resources provided by a "hub" located, for example, as part of a main or headquarters operation. The organization may utilize multiple branches and/or hubs or other network nodes depending on its particular needs. In this example, the branch subnet 105 includes a number of client computers $118_{1, 2 \ldots N}$ (such as personal computers or "PCs") that place data traffic onto the WAN 116 and take traffic from the link in both directions between the branch subnet 105 and hub subnet 112. Client computers 118 commonly run business and productivity applications such as word processing, e-mail, spreadsheets, and the like.

A number of centralized resources $124_{1, 2 \ldots N}$ such as servers are configured at the hub 112 to provide services to the client computers 118 in the branch 105. Such services commonly include those provided by a file server $124_1$, mail server 124₂ and web server 124ₙ. However, it is emphasized that these servers are merely illustrative and the actual number and configuration of servers may vary from that shown and will generally be dependent upon the requirements of a particular branch-hub deployment. The consolidation of server infrastructure into the hub 112 typically enables all maintenance, troubleshooting, security policy enforcement, backups and auditing to be performed centrally which can significantly lower TOC for most enterprises.

WAN 116 may operate over portions of private networks and/or public networks such as the Internet. WAN 116 is representative of many current WANs that are commonly utilized to support remote branch operations. Typical WAN issues include high network latency, constraints on bandwidth, and packet loss. Such limitations can constrain branch productivity. In addition, many business or productivity applications operating in the network 100 were developed for LAN environments and are not particularly WAN-optimized.

Consequently, it is recognized that optimizing the utilization of the limited available WAN bandwidth can significantly contribute to better user experience in the branch 105. Optimizing WAN traffic provides users with the perception of a quick and responsive network and an overall experience in the branch that is more transparent, seamless, and LAN-like. In addition, many enterprises will benefit from lowered operating costs which would result from a decrease in the traffic crossing the WAN 116.

Figure 2:
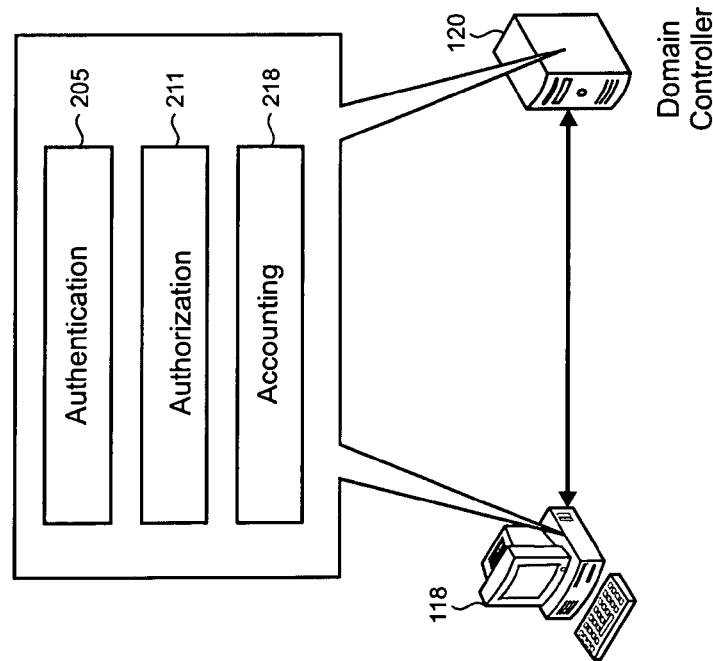
FIG. 2 shows an illustrative interaction between a user at a client device in the branch subnet and the domain controller.

A domain controller 120 is utilized in the branch subnet 105 for implementing a user access control system for tracking users at the client computers 118. More particularly, as shown in FIG. 2, the domain controller 120 is configured for implementing AAA (authentication, authorization, and accounting) services for the client computers 118 in the branch subnet as respectively indicated by reference numerals 205, 211, and 218.

The authentication service 205 provides the ability to identify someone, known as a principal or client, and to control the client's access to resources. Authentication is thus the act of validating a client's identity. Generally, clients must present some form of evidence, known as credentials, proving who they are for authentication. Typically, credentials include a username/password pair.

After authenticating a principal, the next step is to determine whether that principal has permission to access the resources it is requesting. This process is known as authorization and provided by the authorization service 211. There are several schemes to determine if an authenticated principal has authorization to access a particular resource.

For example in a Microsoft Windows® Server context, authentication is provided by the server infrastructure and server operating system. Any communication between client and application must first pass through the server and any process that runs on a Windows server does so in the context of an authenticated user account. In addition, when using the Microsoft NTFS file system (New Technology File System), the operating system maintains an access control list ("ACL") for every resource it controls, which serves as the ultimate authority for resource access permissions.

The accounting service 218 measures the consumptions of the resources 124 by users at the client computers 118. Common measurements include the amount of time that the user is logged on during a use session, or the amount of data transmitted to or received from the hub 112. The accounting service 218 will typically log statistics and usage data pertaining to a user's session on the network for purposes of billing, planning, trend analysis, resource allocation and utilization, capacity planning, and similar activities.

Returning back to FIG. 1, WAFS controllers 126₁ and 126₂ are located in respective subnets (i.e., the branch 105 and hub 112) of the network 100 in a symmetrical configuration. The WAFS controllers 126 are located in the direct traffic paths at opposite ends of the WAN 116.

Figure 3:
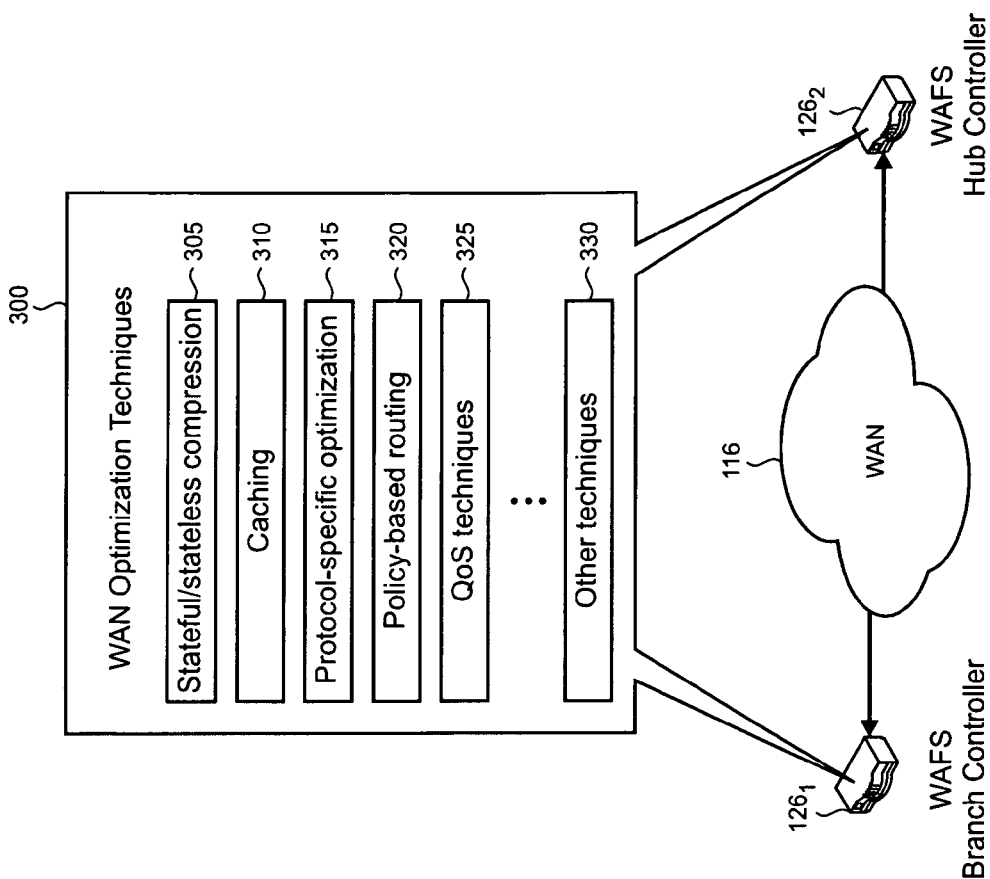
FIG. 3 shows a set of illustrative WAN optimization techniques that may be applied by the WAFS controllers shown in FIG. 1.

In this illustrative example, the WAFS controllers 126 are configured to overcome some of the limitations in the WAN 116 by optimizing traffic flowing over the link. As indicated in FIG. 3, such optimization is typically implemented using various techniques 300, such as stateless and stateful data compression 305, caching 310, protocol optimization 315, policy-based routing 320, quality of service ("QoS") techniques 325, and other conventional techniques 330. It is noted that the use of the WAFS controllers is intended to be illustrative and that other arrangements for optimizing traffic may also be utilized including solutions that are not necessarily locally- or client-based as may be required to meet the needs of a particular implementation.

Data compression algorithms typically identify relatively short byte sequences that are repeated frequently over time. These sequences get replaced with shorter segments of code to reduce the size of the data that gets transmitted over the WAN link. Data compression can be implemented using various methodologies or algorithms including stateless compression such as the well known LZW (Lempel-Ziv-Welch) technique, and stateful compression such dictionary-based compression. Dictionary compression relies on storing all the data passing a compression engine in an external dictionary. In addition to storing the data, a compression engine identifies the data already seen and replaces it with a much smaller reference to an index in the dictionary, thereby enabling subsequent decompression of the data.

Protocol-specific optimization typically looks to improve throughput on the link by overcoming some of the inherent limitations in so-called "chatty" transfer protocols such as CIFS (Common Internet File System) and MAPI (Message Application Programming Interface) that were primarily designed for low latency local area networks. Unless optimized, such protocols can experience significant performance degradation 7when used on less responsive WANs.

Caching entails the WAN compression server 126 simulating an application server by watching all requests and saving copies of the responses. If another request is made from a client computer 118 for the same file, the WAN compression server 126 functions as a proxy and, after validating with the server that the file has not been altered, may serve the file from its cache.

Policy-based routing is commonly used to implement quality of service techniques that classify and prioritize traffic by application, by user, or in accordance with characteristics of the traffic (e.g., source and/or destination addresses). In combination with queuing, policy-based routing can allocate available WAN bandwidth to ensure that traffic associated with some applications does not disrupt enterprise-critical traffic. Prioritization may be implemented, for example, using policy-based QoS to mark outbound traffic with a specific Differentiated Services Code Point ("DSCP") value. DSCP-capable routers read the DSCP value and place traffic being forwarded into specific queues (e.g., a high-priority queue, best effort, lower than best effort, etc.) that are serviced based on priority.

In accordance with the principles of the present user-based WAN optimization arrangement, the WAFS controllers 126 are further arranged to enable user-based WAN optimization that may be expected to significantly improve the user experience at the branch subnet 105. The WAN optimization is implemented by integrating functionality of the user access control system provided by the domain controller 120 with that of WAFS controllers 126 which are configured to perform user-based data pre-fetching according to a set of heuristics.

Figure 4:
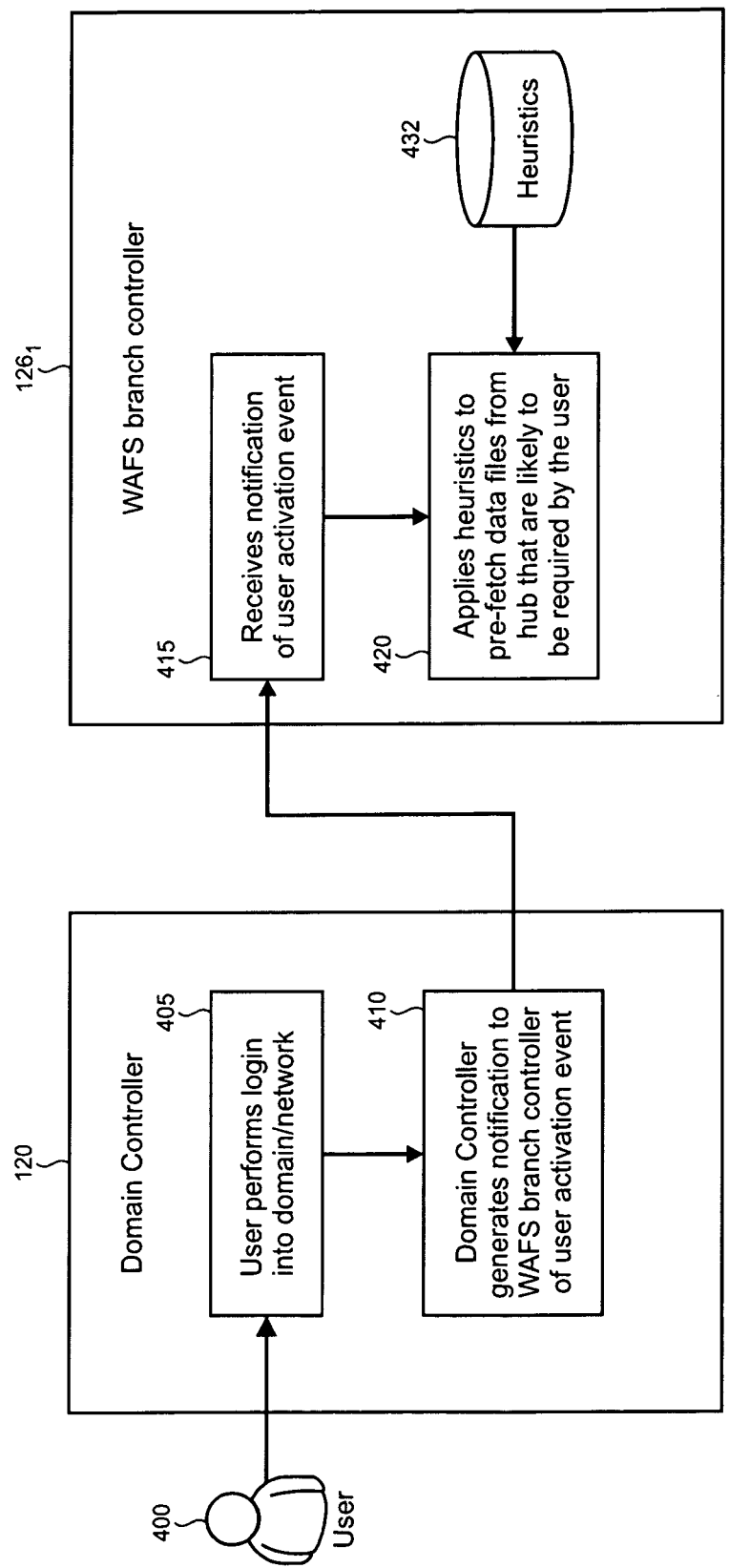
FIG. 4 shows an illustrative data flow between a domain controller and the WAFS controller at the branch subnet.

More particularly, as shown in FIG. 4, the domain controller 120 is configured to enable the user 400 to log in to the domain and/or network operating in the hub and branch network 100 (405). Upon user login or other action that is indicative that the user is using a computer in the domain or network, the domain controller 120 generates a notification to the WAFS branch controller 126₁ of the activation event (410).

When the notification is received (415), the WAFS branch controller 126 applies heuristics 432 to identify files and data for pre-fetching from the centralized resources 124 at the hub subnet 112 that are likely to be required by the user (420). While the heuristics 432 are shown in this example as being located in a store that is associated with the WAFS branch controller 126₁, it is noted that the heuristics 432 may be alternatively implemented in a store that is associated with the WAFS hub controller 126₂, the domain controller 120 or located in a standalone store.

Figure 5:
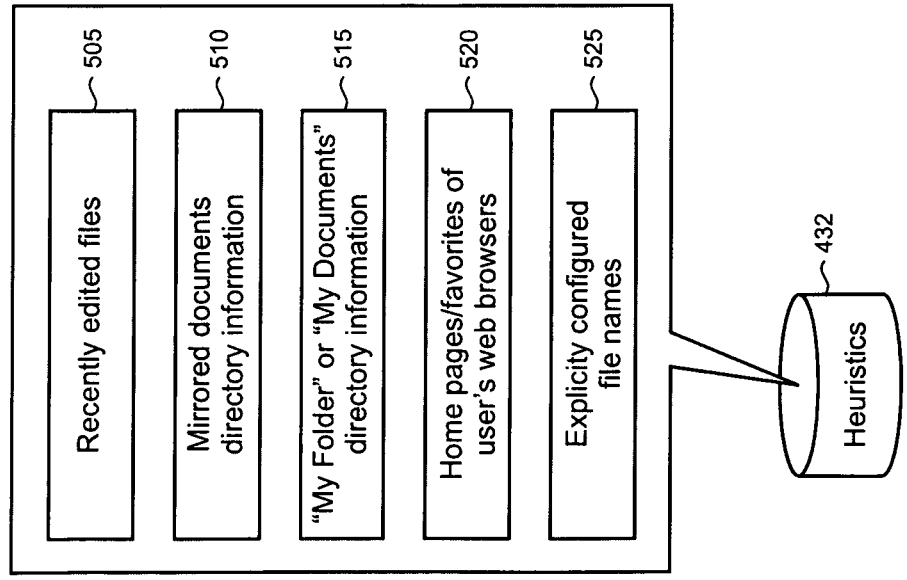
FIG. 5 shows an illustrative set of heuristics that may be applied for pre-fetching files and/or data based on user behavior.

An illustrative set of heuristics 432 is shown in FIG. 5 which takes the behavior of the user 400 into account. Such user behaviors may be tracked, for example, by the accounting functionality implemented in the domain controller 120. It is emphasized that the heuristics 432 are merely illustrative and that the particular heuristics utilized can vary depending on the requirements of a specific implementation and not all the heuristics shown need necessarily be used in every case.

The illustrative heuristics include a heuristic used to identify files that were recently edited 505 by the user 400, for example during the previous session before the current login. This heuristic recognizes that the recently edited files 505 could represent work in progress and makes use of the likelihood that the user will require the files again in the current session.

A heuristic may be used to identify and pre-fetch directory information for mirrored documents 510. Such directory information identifies those files—typically important, large, or frequently accessed files—that are mirrored across all of the organization's branches for which requests may be fulfilled locally. Mirroring is commonly utilized to speed user access to such files and often makes more efficient use of bandwidth on the WAN 116 by transferring the mirrored content when the network is otherwise idle, for example at night, to thus free up bandwidth for other applications during the day.

Similarly, a heuristic can be utilized to identify directory information that can be pre-fetched for a networked folder for user 400 (e.g., "My Folder" or "My Documents") directory information 515) that is stored on a file server among the centralized resources 124 in the hub subnet 112.

A heuristic may be used for identifying and then pre-fetching the home page 520 set by the user 400 in a web browser that is installed on a local client computer 118. The home page is the first webpage that is displayed after the web browser is launched by the user 400. Home pages are typically user-selectable in many enterprise network environments. Given the Internet's popularity as a source of news, business information, and other important resources, pre-fetching the home page for the user 400 will often be effective as the web browser is typically a frequently utilized application that is often launched shortly after start up of the client computer. The heuristic may also be optionally extended to "favorite" web pages that are bookmarked by the user 400.

Figure 6:
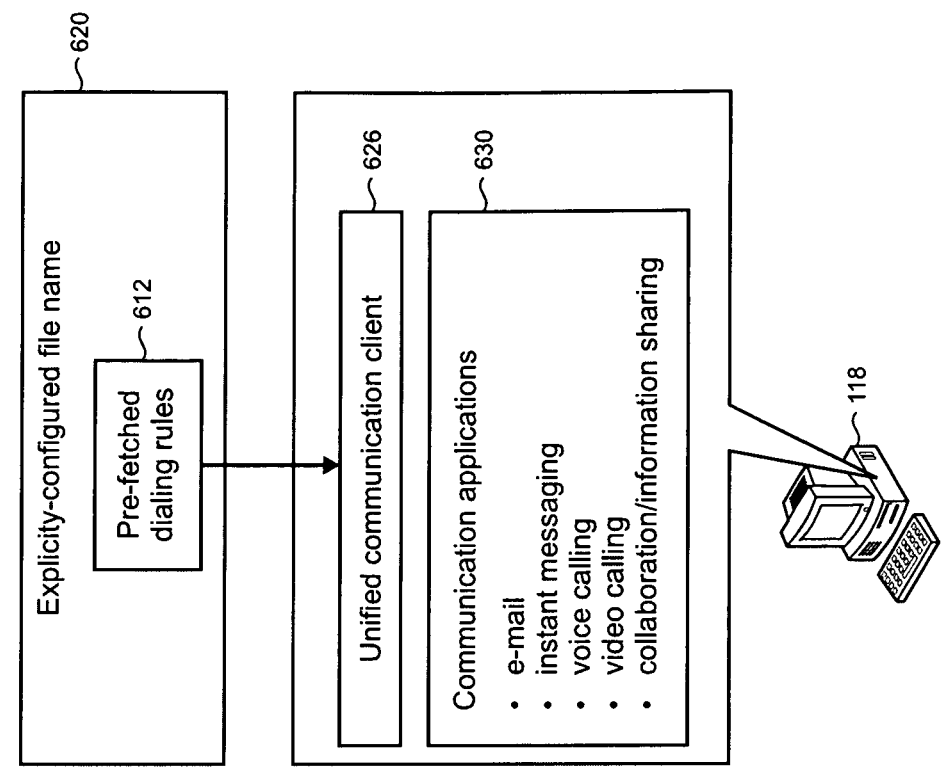
FIG. 6 shows an illustrative example of an explicitly configured file that provides dialing rules for a unified communication client on a computer.

A heuristic relating to explicitly configured file names 525 enables, for example, an enterprise network administrator to configure certain application profile data to be pre-fetched to the client computer 118. An illustrative example of the application of this heuristic is shown in FIG. 6 where dialing rules 612 having an explicitly-configured file name 620 are pre-fetched for a unified communication client 626.

In this example, the unified communication client 626 running on a client computer 118 helps users be more productive by enabling them to communicate easily with others in different locations or time zones using a range of different communication applications 630, including e-mail, instant messaging ("IM"), and voice and/or video telephone calls. Integration with collaboration and information sharing applications, as well as office productivity applications such as word processing, spreadsheet, and presentation, also gives the users different ways to communicate through the unified communications client 626. It is noted, however, that the dialing rules 612 are simply illustrative and that other types and kinds of application profile information or data may also be pre-fetched according to the heuristic.

The data and files at the centralized resources 124 at the hub subnet 112 identified through application of the heuristics 432 are pre-fetched using the WAFS controllers 126 during the time period in which the client computer is initialing up its operating system and before the desktop applications become available to the user 400. By performing the pre-fetching in such a manner, the pre-fetched data and files may be made available at about the same time as the client computer 118 has completed its startup processes.

Figure 7:
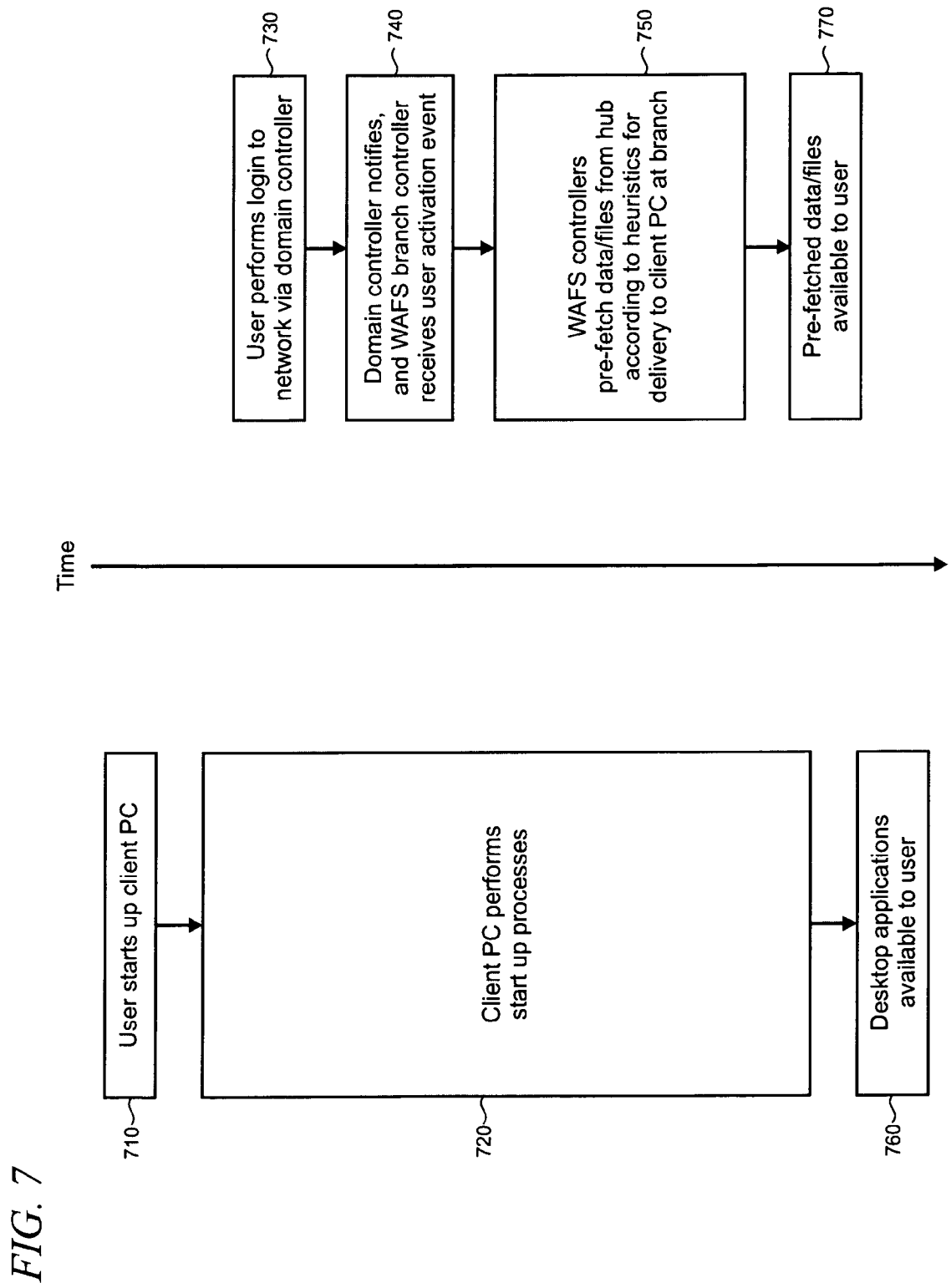
FIG. 7 is a flowchart of an illustrative user experience that is supported by the present WAN optimization arrangement.

Timing the pre-fetching to coincide with startup provides the user with the perception of a quick and responsive network and an overall experience in the branch subnet 105 that is more transparent, seamless, and LAN-like. In addition, many enterprises will benefit from lowered operating costs which result from a decrease in the traffic crossing the WAN 116. The timing of the pre-fetching is shown in the flowchart provided in FIG. 7.

The user 400 begins by starting up the client computer 118 (710). As the client computer performs its normal start up processes (720), the user is typically provided with a prompt and performs a login to the enterprise network (730) via the domain controller 120. The domain controller sends a notification of the user activation event which is received by the WAFS branch controller 126₁ (740).

The WAFS controllers 126 operate to pre-fetch data and/or files identified through the application of one or more heuristics 432 from the centralized resources 124 at the hub subnet 112 (750). As data and files are sent across the WAN 116 from the hub subnet 112 to the client 118 in the branch subnet 105, the WAFS controllers 126 may apply one or more WAN optimization techniques 300 as shown in FIG. 3 and described in the accompanying text to utilize bandwidth efficiently and perform the transport with minimized latency.

Once the client computer 118 completes it start up processes and makes the desktop applications available to the user 400 (760), the pre-fetched data and files that are likely to be needed by the user 400 are available in advance or at about the same time that the desktop applications become available to the user (770). That way, as soon as the desktop applications are available on the client computer 118, the user 400 may immediately begin working without needing to wait to access or download the needed data and files over the WAN 116.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method for optimizing a user experience at a client computer in a branch subnet of a network that comprises the branch subnet and a hub subnet, the method comprising the steps of:
    monitoring for a user activation event for a user at the client computer;
    performing accounting services for the client computer to track user behavior by the user comprising tracking the user's consumption of data resources; and
    responsively to the user activation event, sending a notification to a WAN (wide area network) optimization device, the notification being arranged to trigger application of heuristics to identify data resources for the user based at least in part on the user's tracked user behavior for pre-fetching from a centralized resource in the hub subnet, the pre-fetching being commenced by the WAN optimization device subsequent to the user activation event and during startup of the client computer.

2. The method of claim 1 in which the accounting services are incorporated as part of an AAA service.

3. The method of claim 1 in which the WAN optimization device comprises one of a WAFS (wide area file system) controller in the subnet, a WAFS controller that is used pair-wise with a corresponding WAFS controller that is located in network, or a non-client based optimization device.

4. The method of claim 1 in which the user activation event is indicative of an initiation of a login to the network or a work session on the client computer, or other event that is indicative of a user's use of the client computer.

5. The method of claim 1 in which the centralized resources comprise a server selected from one of file server, mail server, or web server.

6. The method of claim 1 in which the heuristics identify data that a user of the client computer will likely need in which likelihood of the need is based on the tracked user behavior.

7. A method for pre-fetching data from a server in a hub subnet of an enterprise network for delivery to a client computer in a branch subnet, the branch subnet and hub subnet being communicatively coupled over a WAN (wide area network) link, the method comprising the steps of:
    receiving a notification from an access control device in the branch subnet that indicates an initiation of a work session by a user on the client computer;
    utilizing one or more heuristics to identify data for pre-fetching from the server, the heuristics being configured for applying user behavior comprising consumption of data resources by the user that is tracked by the access control device, and
    commencing the pre-fetching subsequent to the initiation of the work session and during startup of the client computer before the work session begins.

8. The method of claim 7 including a further step of performing WAN optimization on transport of pre-fetched data over the WAN link.

9. The method of claim 8 in which the WAN optimization includes a technique selected from one of stateless data compression, stateful data compression, caching, protocol-specific optimization, policy-based routing, or quality of service methodology.

10. The method of claim 8 in which the WAN optimization is performed by a set of pair-wise deployed WAN optimization appliances.

11. The method of claim 7 including a further step of storing the one or more heuristics in a store associated with one of access control device or WAN optimization device.

12. The method of claim 7 in which the access control device is selected from one of AAA controller or network controller.

13. The method of claim 7 including a further step of completing the pre-fetching before applications become available on the client computer's desktop after the startup.

14. The method of claim 7 in which the one or more heuristics pertain to at least one of recently edited file, files or folders on the server that are associated with the user, a home page designated by the user for a web browser, or an explicitly configured filename from a network administrator that is indicative of an application profile.

15. An electronic device, comprising:
    a first controller configured to implement a functionality for tracking user behavior by a user, the first controller configured to track the user's consumption of data resources at a client computer at a hub node in the network during a previous work session; and
    the first controller configured to trigger utilization of one or more heuristics at a second controller to identify data resources for the user based at least in part on the user's tracked user behavior for pre-fetching to the client computer upon initiation of a new work session from a server at a branch node in the network, the pre-fetching being commenced subsequent to the initiation of the new work session and during startup of the client computer.

16. The electronic device of claim 15, wherein the one or more heuristics pertain to a file that was edited during the previous work session.

17. The electronic device of claim 15, wherein the one or more heuristics pertain to directory information for a set of documents or for a folder that are mirrored on one or more nodes of the network.

18. The electronic device of claim 15, wherein the one or more heuristics pertain to a file name that is explicitly configured by an administrator of the network.

19. The electronic device of claim 18, wherein the explicitly configured filename comprises an application profile.

20. The electronic device of claim 15, wherein the one or more heuristics pertain to a home page of a web browser.

* * * * *